ABSTRACT OF THE DISCLOSURE

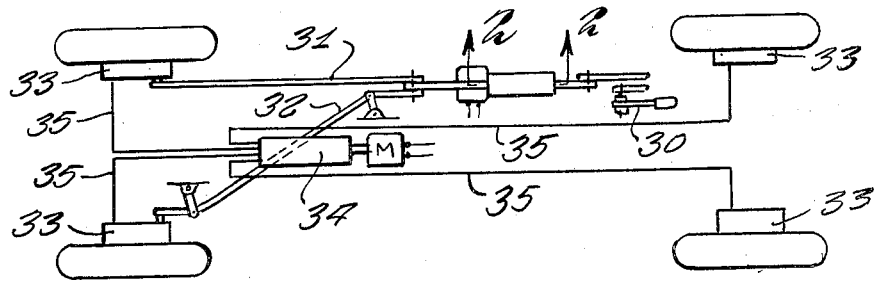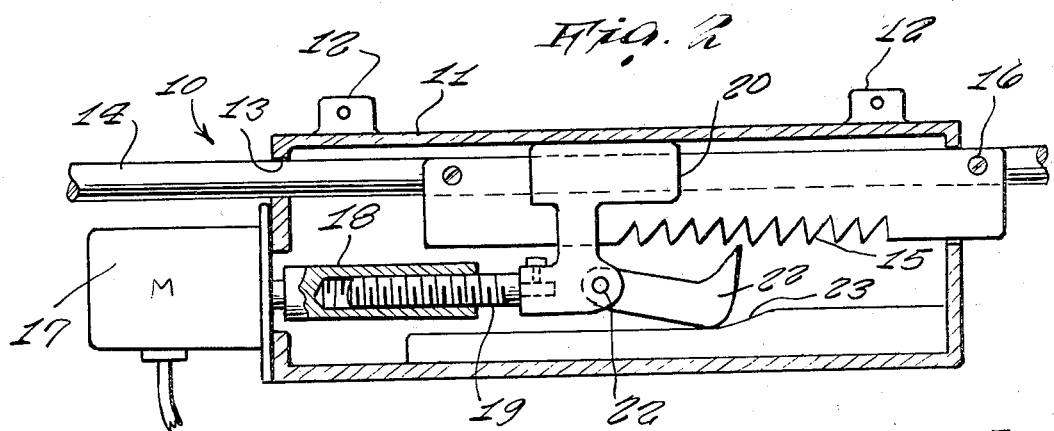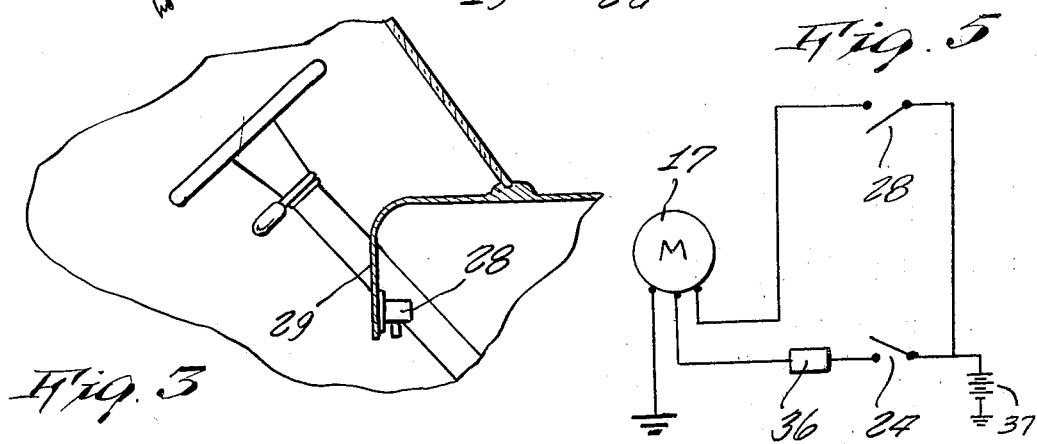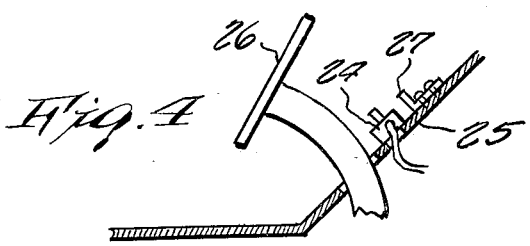
INVENTOR
C. D. EVANS 3,481,434
AUTOMATIC MOTOR DRIVEN SAFETY BRAKE
Calvin D. Evans, Box 193, Holcomb, Kans. 67851
Filed May 11, 1967, Ser. No. 637,690
Int. Cl. B60l 7/08; F16d 65/14
U.S. Cl. 188—162          9 Claims

An automatically operated brake in case the normal hydraulic system of a vehicle fails, including a switch under the conventional brake pedal, the switch activating a motor to cause movement of a pawl to engage a toothed rack secured to the slidable, conventional hand brake rod, thus pushing the hand brake rod into a locked position.

---

This invention relates generally to automobile emergency braking systems.

A principal object of the present invention is to provide an automatic emergency brake for use in case the normal hydraulic system of a vehicle fails. In such a case of failure, the brake pedal, due to loss of brake fluid in the system is depressed fully down to the floor. Ability to push the pedal fully to the floor provides a means for activating the present invention.

Another object of the present invention is to provide a safety brake which responds to the normal movement of a person desiring to brake a vehicle, which is to depress the brake pedal even though the same will not function as the motorist is expecting the same to do.

Yet another object of the present invention is to provide a safety brake which will lock automatically the emergency hand brake of an automobile.

Yet another object of the present invention is to provide a safety brake which may be released after an emergency by means of a manually operated switch conventionally located under the dashboard.

Yet another object of this invention is to provide a safety brake which responds to the normal movement of a person desiring to brake a vehicle, which is to depress the brake pedal even though the same will not function as the motorist is expecting the same to do.

Yet another object of the presentinvention is to provide a safety brake which will lock automatically the emergency hand brake of an automobile.

Yet another object of the present invention is to provide a safety brake which may be released after an emergency by means of a manually operated switch conventionally located under the dash board.

Yet another object of the present invention is to provide a safety brake which will not interfere in the normal operation of the hand brake or in the normal operation of the brake pedal when the hydraulic system is in proper operating condition.

Other objects of the present invention are to provide a safety brake which is simple in design, rugged in construction, easy to use and efficient in operation.

These and other objects will be readily evident upon a study of the following specifications and the accompanying drawing wherein:

FIGURE 1 is a plan view of an automobile chassis showing the invention therewith, FIGURE 2 is a cross-sectional view taken through the safety brake on lines 2—2 of FIGURE 1, FIGURE 3 is a cross-sectional view of the dashboard showing the release switch, and FIGURE 4 is a side cross-sectional view showing an automobile brake pedal and switch associated therewith, FIGURE 5 is an electric circuit of the invention.

Referring now to the drawing in detail, the reference numeral 10 represents a safety brake according to the present invention and which may be installed into existing vehicles as well as within new cars presently being manufactured.

The safety brake includes a case 11 having pads 12 for purpose of securement to the chassis of a vehicle, the case having openings 13 to allow moveable hand brake rod 14 to pass through a toothed rack 15 secured thereto by means of screws 16. A three pole or reversible electric motor 17 secured to the case 11 carries an internally threaded shaft 18 threadingly engaged with a non-rotable high pitched screw 19 secured to a slidable bracket 20, the bracket 20 having a pawl attached pivotably free thereto by means of pin 22. A cam 23 fitted into the case 11 provides a track along which the pawl 21 slides, the pawl being selectively engageable or disengageable with the toothed rack 15.

A mercury switch 24 is mounted in the floorboard 25 below the brake pedal 26, and a limit stop 27 for limiting the travel of the pedal is mounted adjacent to the mercury switch as identified as 27.

A release switch 28 is mounted under the dashboard 29 of the vehicle where it may be manually operated when desired.

As shown in FIGURE 1 of the drawing, the hand brake rod 14 is connected in an conventionally well known manner as at one end to an hand brake assembly 30, and at its opposite end to a conventional brake rod linkages 31 and 32 which go to the brakes within brake drums 33 of the wheels.

In normal operative use, the vehicle is braked by means of hydraulic fluid from the master cylinder 34 being moved through brake lines 35 to the brakes in the wheel cylinders. Should this system fail due to loss of brake fluid in the system, the brake pedal 26 will be allowed to be pushed to the floor 25 and on its way close the mercury switch 24 to close the circuit to the motor 17, thus causing the internally threaded shaft 18 to rotate in one direction to cause the slidable bracket carried on the non-rotatable high pitch screw 19 to move forwardly within the case 11 and cause the pawl 21 to ride upon cam 23 thus causing the pawl to engage the toothed rack 15 and push the same forwardly and thus push the emergency brake rod into a locked braking position, thus locking the brakes and the wheels. Upon release of the foot from the brake pedal 26, the mercury switch 24 is thrown open. To release the emergency safety brake, the motorist need only to push the release switch 28 under the dashboard 29 to cause the motor 17 to rotate in the opposite direction, thus causing the non-rotatable high-pitched screw to be withdrawn into the internally threaded shaft 18, thus drawing the slidable bracket 20 rearwardly and causing the pawl 21 to drag the toothed rack 15 to disengage the wheel brakes and thereafter the pawl to disengage the the toothed rack. It is to be understood that a cut-off switch 36 is additionally provided for breaking or opening the circuit when the hand brake becomes fully locked. The motor 17 is powered from a battery 37 as shown in FIGURE 5.

In the terminology of some of the claims, the rod 14 is referred to as a reciprocably mounted "element" of a conventional auxiliary or secondary automobile brake system that is powered by the automobile operator and has for its purpose the capability of braking the automobile when parked and also serves as an emergency brake available to the operator in the event of failure of the primary braking system. Also, in the terminology of some of the claims, the toothed rack 15 is referred to as a "driven member" adapted to be secured to the element 14, and the slidable bracket 20 is referred to as a "driving member."

I claim:
1. In an automobile safety brake, the combination of a mechanism for mechanically pulling the emergency hand brake rod automatically, said mechanism being powered by a three pole motor, said motor being electrically connected to a mercury switch mounted upon the floor board, below a brake pedal in an automobile, and said motor being connected additionally to a release switch mounted under the dashboard of said automobile, said mechanism comprising a case having a plurality of lugs for securement to the chassis of an automobile, said case having a pair of openings therethrough for receiving a conventional emergency brake rod through said case, a toothed rack rigidly affixed to said emergency brake rod, said toothed rack being selectively engageable by a pawl mounted by a pin carried by a slidable bracket having a nonrotatably high-pitched screw threadingly received within an internally threaded shaft carried on said motor shaft, and said pawl traveling on a track of cam configuration for purpose of being laterally disposed for selective engagement and disengagement with toothed rack.

2. The combination as set forth in claim 1, wherein a limit stop is secured to said floor board of said automobile adjacent to said mercury switch and below said brake pedal, said limit stop providing a means for limiting the downward travel of said brake pedal against said mercury switch.

3. The combination as set forth in claim 2, wherein a cut-off switch is mounted within the electric circuit between said motor and said mercury switch for purpose of automatically breaking the circuit when hand brake rod is moved into fully locked position and the wheel brakes of said automobile are locked.

4. For use with an auxiliary automobile brake system of the class powered by the automobile driver which includes an elongated, reciprocably mounted, actuating element, apparatus for moving the element comprising a driving member, means for mounting said driving member upon an automobile for travel along a linear path between first and second positions and through an intermediate position spaced between said first and second positions, a driven member adapted to be secured to the element of the brake system, means for drivingly coupling the driving member to the driven member solely when the driving member is disposed in the range of its travel path extending from its intermediate position to its second position, and means including an electric motor for moving the driving member.

5. The combination of claim 4, wherein said electric motor is reversible, and means including first and second normally open electric switch means for selectively energizing said electric motor, upon respective closure of said switch means, to operate in forward and reverse directions, whereby the driving member can be selectively caused to move along its travel path from and toward its first position, respectively, said first switch means including means responsive to the application of an external force thereagainst to close said first switch means, and means for mounting said last recited means in the travel path of a foot brake pedal.

6. The combination of claim 4, wherein said means for drivingly coupling the members comprises the driven member being toothed and the driving member being provided with a movable pawl that is movable into and out of engagement with the teeth of the driven member, and a cam engageable with the pawl for engaging the pawl with the teeth when the driving member is in said range of its travel path.

7. The combination of claim 6, wherein the means for moving the driving member includes a threaded driving means coupling the latter to the electric motor.

8. In combination, an automobile including a primary brake system and an auxiliary brake system, said primary system including a foot pedal that moves to a depressed position on failure of the primary system and the auxiliary system including an elongated, reciprocably mounted, actuating element, and apparatus for moving the element in a direction to operate the auxiliary brake system upon the foot pedal being moved to its depressed position, said apparatus comprising a driving member mounted on the automobile for travel along a linear path between first and second positions and through an intermediate position spaced between said first and second positions, a driven member fixed to the element, means for drivingly coupling the driving member to the driven member solely when the driving member is disposed in the range of its travel path extending from its intermediate position to its second position, said driving member being normally disposed at its first position, operating means including an electric motor for moving the driving member, said last means including an electric circuit for energizing said motor, a normally open electric switch in said circuit, and means responsive to said foot pedal being moved to its depressed position to close said electric switch and to thereby cause the motor to run in a forward direction to move the driving member toward its second position.

9. The combination of claim 8, wherein said motor is reversible, said operating means also including a second electric circuit for energizing said motor to run in a reverse direction, and a second normally open electric switch in said second electric circuit.

References Cited

UNITED STATES PATENTS 2,933,159   4/1960   Stiebinger _____ 188—162 X
3,348,638   10/1967  Littmann _____ 188—162
3,353,634   11/1967  Farrar _____ 188—162 X DUANE A. REGER, Primary Examiner U.S. Cl. X.R.

188—106